Oct. 23, 1962     J. W. ANDERSON     3,059,487
PULLEY STRUCTURE
Filed Oct. 22, 1959

INVENTOR.
JOHN W. ANDERSON
BY W. E. Recktenwald
C. S. Penfold
ATTORNEY

United States Patent Office 3,059,487
Patented Oct. 23, 1962

3,059,487
PULLEY STRUCTURE
John W. Anderson, 578 Broadway, Gary, Ind.
Filed Oct. 22, 1959, Ser. No. 848,031
12 Claims. (Cl. 74—108)

This invention relates to motion-converting devices and more specifically to an improved pulleylike member for use in converting linear motion to oscillatory motion.

It has long been conventional practice to manufacture pulleys by a die-casting process or by a stamping operation. When the stamping method is used, two mating parts are formed from sheet metal, which parts are assembled together face to face in such a way that a cable or the like passing around the periphery of the pulley is disposed between the flared outer portions of the mating parts. This last-mentioned form of pulley has many disadvantages even though it is considered to be a highly desirable and inexpensive way of making a pulley. The chief disadvantage lies in the fact that the cable nests in the depression created by the face-to-face fastening of the mating parts of the pulley such that a reasonable load on the cable wedges the cable between the mating parts thereby stopping any further relative movement between the cable and pulley. Even though the cable might not fail, it becomes frayed due to the excessive pinching and wedging of the parts. When the cable enters and leaves the surface of the pulley in the general vicinity of the same side of the pulley, the separate reaches of the cable abrade one another causing further fraying that contributes to breaking of the cable.

In my U.S. Patent 2,901,764, issued September 1, 1959, a circular pulleylike member is illustrated for converting the reciprocating linear motion of a motor-driven link member to the oscillatory motion of the shaft and wiper arm used on the windshield of current-type automobiles. The pulley illustrated in that patent is shown as circular in shape, although it is within the context of the patent that the pulley could be of some shape less than a full circle as long as the operative peripheral portion is substantially smoothly curved in shape. In my said patent, a pair of grooves are formed about the periphery of the pulley such that one reach of a cable member is seated in one groove and another adjoining reach of the cable is switched over and is seated in the other groove whereby the cable encircles the pulley. As the respective reaches of the cable enter and leave the pulley, they pass each other in spaced relationship so as not to come in contact with and abrade each other. The forming of the parallel grooves in the peripheral surface of the pulley adds considerable expense to the cost of production of the pulley.

It is, therefore, a principal object of this invention to provide an improved pulleylike structure that overcomes the disadvantages of the prior art and at the same time maintains the more desirable features thereof.

It is an object of this invention to provide an improved pulleylike structure made of relatively inexpensive stamping members.

It is a further object of this invention to provide an improved pulleylike structure wherein the two body portions are identical and made from the same die.

It is still a further object of this invention to provide an improved pulleylike structure wherein the circumference of the pulleylike structure does not define a full circle, ellipse or the like, but rather is cut off beyond that portion that is not needed for operation of the resulting system.

And a still further object of this invention is to provide a pulleylike structure having only a partially circular shape or a partially elliptical shape or the like, which structure requires less clearance space for installation and operation in a system.

It is another object of this invention to provide an improved pulleylike structure having a separate race member that is inexpensive to manufacture, simple to install in the pulleylike structure, and highly efficient in use.

It is still another object of this invention to provide an improved race member for a pulleylike structure that can be formed with any number of spaced cable receiving channels or grooves for maintaining overlapping reaches of a cable out of abrading contact with each other.

And another object of this invention is to provide an improved race member for a pulleylike structure that has a novel retaining means for positioning said race member relative to the body of the pulleylike structure.

Other objects and advantages of the invention will become apparent after the description hereinafter set forth is considered in conjunction with the drawing annexed hereto.

Figure 1:
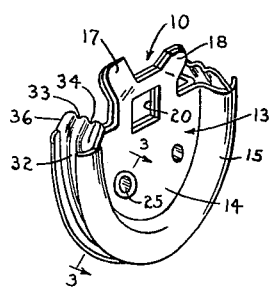
FIGURE 1 is a perspective view of a pulleylike member encompassing the features of my invention.
Figure 2:
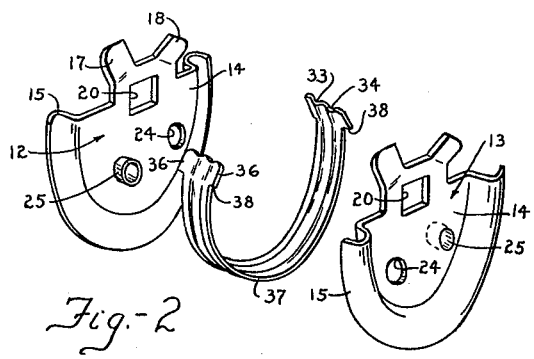
FIGURE 2 is a blown-apart perspective view of the elements of my invention as illustrated in FIGURE 1.
Figure 3:
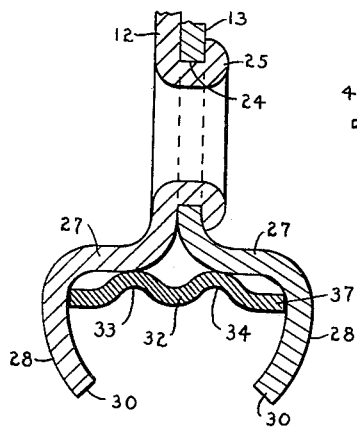
FIGURE 3 is an enlarged cross-sectional view taken along the lines 3—3 of FIGURE 1.
Figure 4:
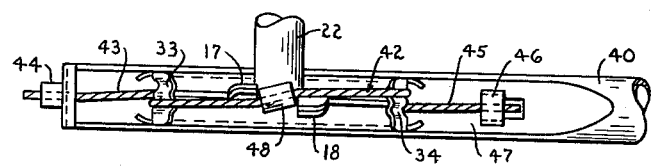
FIGURE 4 is a top plan view of my invention as used in conjunction with a reciprocating link member, as shown further in FIGURE 6.
Figure 5:
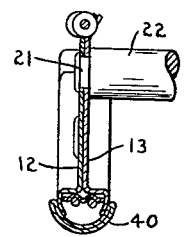
FIGURE 5 is a cross-sectional view taken along the lines 5—5 of FIGURE 6.
Figure 6:
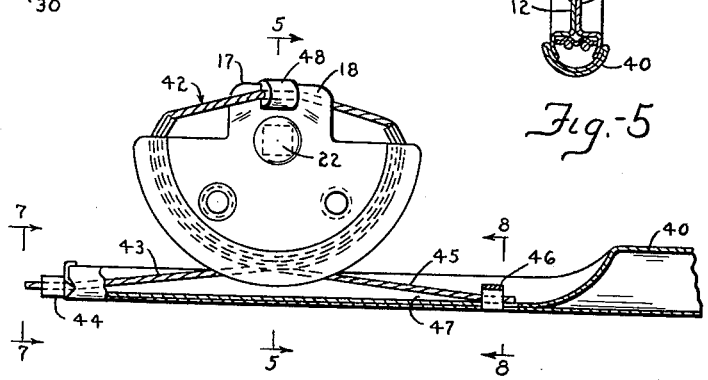
FIGURE 6 is a side elevational view partially in section of my invention shown in connection with a reciprocating link member.
Figure 7:
FIGURE 7 is a view taken along the lines 7—7 of FIGURE 6.
Figure 8:
FIGURE 8 is a cross-sectional view taken along the lines 8—8 of FIGURE 6.

Referring to the drawings and particularly FIGURES 1–3 thereof, the numeral 10 designates an assembled pulleylike member without the associated cables adapted for use therewith. The pulleylike member 10 is comprised of a pair of identical mating parts 12 and 13, each part having a flat body portion 14 formed of sheet metal or the like to which an annular flange 15 is integrally formed about the periphery thereof. A pair of oppositely offset upwardly extending ears 17 and 18 are formed integrally with each body portion 14 and are spaced apart a short distance in the plane of said body portion. Formed through an appropriate part of each body portion 14 is a shaped aperture 20, the walls of which are adapted to engage with a correspondingly shaped end portion 21 of a drive shaft 22 when assembled for use. The center of the aperture 20 is located, in the illustrated form, at the geometrical center of the semicircular peripheral arc so that the distance from the center of the aperture 20 to the contacting surface of a cable on the pulleylike member is constant. It is to be understood that the center of the aperture 20 could be eccentrically placed with respect to the edge of the pulley without departing from the spirit of this invention.

A circular aperture 24 is formed through one preselected part of each body portion 14 and a transversely formed hollow lug 25 extends in a direction opposite to the direction of the peripheral flange 15. The position of each lug 25 and each aperture 24 is such that when the body portions 14 of the two mating parts 12 and 13 are brought together face to face, the lug 25 of one part will pass through the aperture 24 of the other part and vice versa. The two parts 12 and 13 are made from the same die and are identical in construction so that reversing one of the parts makes an equal and opposite part for assembling with the first part to form the pulleylike member.

The annular flanges 15 formed on the edges of the parts 12 and 13 are shaped in such a way that the base or bottom wall portion 27 is formed substantially flat and extends substantially at a right angle to the body portion 14 of each part. The outer end of the base or bottom wall 27 flows smoothly into the side wall 28 which in cross section (FIGURE 3) is curved first outwardly and then inwardly such as to create an outer edge 30 overhanging or overlapping a limited portion of the bottom wall 27 of the flange 15.

An elongate rim or raceway member 32 is stamped or formed from sheet material or the like and has a pair of spaced-apart grooves 33 and 34 shaped into the flat surface thereof in substantially parallel relation to each other along the length of said member. A pair of ears 36 extend outwardly beyond the side edges 37 of each end portion of the rim member 32 in such a way as to form longitudinally spaced abutments 38 on each side thereof. The rim member 32 is shaped in a substantially circular form with a radius form with a radius of curvature substantially equaling the radius of curvature of the peripheral edge of the mating parts 12 and 13. In assembling the parts of the pulleylike member, the rim member 32 is placed upon the bottom wall 27 of one part 12 with the abutments 38 overhanging the ends of the flange. The other part 13 is brought into engagement therewith by passing the respective lugs 25 through the respective apertures 24 with the abutments 38 on the opposite side of the member engaging with the ends of the flange on said part 13.

A simple peening operation on the outer end of each lug 25 folds the material of the lug over into engagement with the outer face of the respective parts 12, 13 so as to hold the parts assembled relative to each other and to hold the rim member 32 in operative position with respect to the parts.

With the parts 12 and 13 assembled together about the rim member 32, the overhanging edges 30 of the flanges 15 prevent the rim member 32 from radial removal with respect to the pulleylike member while the ears 36 on the rim member 32 prevent relative rotatable movement between the rim member 32 and the body portions 14 of parts 12, 13. The rim member 32 is adapted to seat upon the respective flat bottom walls 27 of the flanges 15 of parts 12 and 13 to form a backing for the rim member for a purpose to be obvious hereinafter.

The pulley of the instant invention has many uses in many uses in many different devices but as herein shown, for the purposes of illustration, it is assembled with a receprocating link member 40 which can be attached to a motor or the like. The pulleylike member 10 is rigidly attached to the end of the pivot shaft 22 for simultaneous movement therewith about the longitudinal axis of said shaft. A cable member 42 has one end portion 43 fastened by means of lug 44 to the outer end of the link 40. From said end portion 43 the cable 42 extends into engagement with one groove 33 in the rim member 32 of the pulley and partially encircles the pulley. The cable 42 passes between the oppositely disposed ears 17 and 18, engages in the other groove 34 in the rim member, and passes the rest of the way around the pulleylike member 10. The other end portion 45 of the cable is fastened by means of clip 46 to an intermediate portion 47 of the link. A stop lug 48 is fastened to an intermediate portion 47 of the link. A stop lug 48 is fastened to an intermediate portion of the cable 42 and fits between the inner edges of the ears 17 and 18 so as to prevent sliding movement of the cable relative to the pulley.

As the link member 40 is reciprocated in a linear path, first one portion of the cable wraps itself into one of the grooves in the rim member of the pulley as another portion of the cable unwraps with respect to the other groove in said rim member. The wrapping and unwrapping of the cable relative to the grooves in the pulley to oscillate about the axis of the shaft. Since each end of the cable rides in its own groove in the rim member, there is no abrading action between overlapping portions of the cable nor is there binding between the cable and the depression created by the assembly of the mating parts of the pulley.

In the illustrated form of the invention, the outer periphery curved side walls 28 of the flanges 15 of the pulley constitute bearing surfaces in that they engage the inner surface of the shaped walls of the end portion of the link 40 so as to add stability and smoothness to the motion conversion from the link to the pivot shaft.

It is believed to be obvious that the mating parts 12 and 13 of the pulley can be readily stamped from flat sheet stock such as metal or the like in a highly efficient and inexpensive operation. Likewise, the rim member 32 can be formed in a simple stamping operation wherein the ears 36 forming the abutments 38 and the grooves 33 and 34 are simultaneously formed in one operation.

It is to be understood that the pulleylike member could be made in a complete circle or in any desired segment of a circle, as well as being shaped as an ellipse or the like, without departing from the spirit of the invention. The extent or shape of the peripheral surface depends upon the contact required and the amount of angular movement to be imparted to the shaft 22.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:

1. In a pulley assembly and in combination a pair of oppositely facing mating parts, each part having a substantially flat body portion, means for attaching said mating parts together, a flange integrally formed about a substantial portion of the periphery of each part, an elongate rim member extending along said flanges, means securing the ends of said rim member to said mating parts at the opposite ends of said flanges, said rim member having a ridge defining a pair of substantially parallel grooves lying along an axis substantially parallel to the periphery of the mating parts.

2. In a pulley assembly and in combination a pair of oppositely facing mating parts, each part having a substantially flat body portion adapted to engage in face-to-face relationship the flat body portion of the other part, an annular-shaped flange integrally formed about the periphery of each part, each flange comprising a bottom wall connected to and extending at right angles from said body portion, a side wall connected to and extending radially outwardly with respect to said bottom wall, and a rim member seated between said side walls and upon said bottom walls thereof, said rim member having a peripherally disposed rib defining a pair of substantially parallel grooves adapted to receive a cable member therein, said radially extending side walls being curved inwardly progressively from the rim member to their outer periphery thus defining opposite externally disposed bearing surfaces.

3. In a pulley assembly and in combination a pair of oppositely facing mating parts, each part having a substantially flat body portion, each body portion having a fastening lug and a lug opening formed therein in such a way that they are adapted to coact with the corresponding lug and opening in the other body portion when said body portions are assembled face to face, an annular-shaped flange integrally formed about the periphery of each part, each flange having in cross section a substantially flat bottom wall directed away from the plane of the faces and a curved side wall curving inwardly and facing in the direction of the flange of the other part thereby defining an externally disposed bearing surface, and a rim member seated between said curved side walls of the flanges and upon the flat bottom walls thereof, said rim member having a pair of substantially parallel grooves formed therein along an axis substantially parallel to the periphery of the mating parts.

4. In a pulley assembly and in combination a pair of oppositely facing noncircular mating parts, each part having a substantially flat body portion adapted to be engaged in face-to-face relationship with the flat body portion of the other part, an annular-shaped flange integrally formed about the periphery of each part, each flange comprising a bottom wall connected to and extending at right angles from said body portion, a curved side wall connected to and extending outwardly at substantially a right angle with respect to said bottom wall, and a rim member seated between said side walls and upon said bottom walls thereof, said rim member having means thereon for limiting relative movement of the rim means and mating parts and having a peripherally disposed rib defining a pair of substantially parallel grooves adapted to receive a cable member therein, said side walls progressively curved inwardly beyond the rim member thereby defining an externally disposed bearing surface along the outer portion thereof.

5. In a pulley assembly and in combination a pair of oppositely facing mating parts, each part having a substantially flat body portion, fastening means for securing said mating parts together, pivot shaft means connected with the body portions of said mating parts and extending at a right angle with respect to said mating parts, an annular-shaped flange integrally formed about the periphery of each part and comprising a bottom wall and a curved side wall, said bottom wall being disposed at substantially a right angle with respect to said body portion, said side wall being curved inwardly so as to position the outer edge in overlapping relation with respect to a portion of said bottom wall, and a rim member seated between said inwardly curved side walls and upon the flat bottom walls thereof, said rim member having a longitudinally raised ridge for defining a pair of substantially parallel channels therein for operatively receiving respective portions of a cable member.

6. In a pulley assembly and in combination a pair of oppositely facing mating parts, each part being substantially semicircular in shape and having a substantially flat body portion, fastening means for securing said mating parts together, pivot shaft means connected with the body portions of said mating parts and extending at a right angle with respect to said mating parts, an annular-shaped flange integrally formed about the circular periphery of each part and comprising a bottom wall and a curved side wall, said bottom wall being disposed at substantially a right angle with respect to said body portion, said side wall being curved inwardly so as to position the outer edge in overlapping relation with respect to a portion of said bottom wall, and a rim member seated between said inwardly curved side walls and upon the flat bottom walls thereof, said rim member having means on each end portion in engagement with ends of said side walls for securing said rim member to said mating parts so as to prevent relative movement therewith, said rim member having a raised ridge for defining a pair of substantially parallel channels therein for operatively receiving respective portions of a cable member.

7. In a pulley assembly and in combination a pair of partially circular oppositely facing mating parts, each part having a substantially flat body portion, means for attaching said body portions of said mating parts together, an annular flange integrally formed about the periphery of each part and having open ends, each flange comprising a bottom wall and a side wall, said bottom wall being connected with said body portion and being disposed substantially parallel with the axis of said circular parts, said side wall being connected with said bottom wall and being disposed substantially perpendicular to said bottom wall, and rim means seated between said side walls of the flanges and upon the flat bottom walls thereof, said last-named means having abutment means at each end portion for contacting the open ends of said partially circular parts for holding said rim means in position, and a longitudinal ridge in said rim means for defining a pair of substantially parallel grooves along an axis substantially parallel to the periphery of the mating parts.

8. A cable-driven assembly comprising a support member having a peripheral portion describing an incompletely closed curve, and an elongate member longer than the peripheral portion and having a pair of longitudinally extending substantially parallel cable-receiving grooves therein, said elongate member being applied to said support member and curved to conform generally to said incompletely closed curve peripheral portion, the remaining peripheral portion of said support member between the ends of said incompletely closed curve peripheral portion accommodating the ends of said elongate member which are bent inwardly to secure said elongate member to said support member and also accommodating crossing over of a cable from one of said grooves to the other.

9. A cable-driven assembly comprising a support member formed of two substantially flat body portions secured together and having peripheral flange portions thereon extending partly therearound and describing an incompletely closed curve, and an elongate member longer than the peripheral portion and having a pair of longitudinally extending substantially parallel cable-receiving grooves therein, said elongate member being applied to said support member and curved to conform generally to said incompletely closed curved flange portions, the remaining peripheral portions of said body portions between the ends of said incompletely closed curved flange portions accommodating the ends of said elongate member which are bent inwardly to secure said elongate member to said flange portions and also accommodating crossing over of a cable from one of said grooves to the other.

10. A pulley comprising: a pair of mating parts, each part having a substantially flat body portion adapted to engage in face-to-face relationship with the corresponding body portion on the other part, said body portions having a curved peripheral portion with ends thereof defining less than a closed curve, an annular-shaped flange integrally formed about the periphery of each part, each flange comprising a bottom wall connected to and extending at right angles from the body portion, a side wall connected to and extending generally radially outwardly with respect to the bottom wall, and a rim member seated on the bottom wall of each part and fixedly positioned between the side walls, said generally radially extending walls inturned toward each other at their outer portions beyond the rim member and overlying the rim member and defining an opening therebetween to receive cable members about the rim member, opposite ends of the rim member lying adjacent the ends of the peripheral portion and bent inwardly overlying the peripheral ends to secure the rim member with respect to the mating parts.

11. The structure of claim 10 wherein the bent end portions accommodate crossing over of a cable from one side of the rim to the other.

12. The structure of claim 10 wherein the inturned walls define a convex bearing surface.

References Cited in the file of this patent

UNITED STATES PATENTS

| | | |
|---|---|---|
| 1,194,589 | Barry | Aug. 15, 1916 |
| 1,600,098 | Crumley | Sept. 14, 1926 |
| 1,627,558 | Grunwald | May 10, 1927 |
| 2,016,927 | Korte | Oct. 8, 1935 |
| 2,530,732 | Ronning | Nov. 21, 1950 |
| 2,655,813 | Howell | Oct. 20, 1953 |
| 2,886,313 | Wroka | May 12, 1959 |
| 2,901,764 | Anderson | Sept. 1, 1959 |

FOREIGN PATENTS

| | | |
|---|---|---|
| 647,006 | France | Nov. 19, 1928 |
| 678,333 | France | Dec. 23, 1929 |

UNITED STATES PATENT OFFICE
CERTIFICATE OF CORRECTION

Patent No. 3,059,487              October 23, 1962

John W. Anderson

It is hereby certified that error appears in the above numbered patent requiring correction and that the said Letters Patent should read as corrected below.

Column 3, line 35, strike out "with a radius form"; lines 62 and 63, strike out "in many uses"; same column 3, line 65, for "receprocating" read -- reciprocating --; column 4, lines 4 and 5, strike out "A stop lug 48 is fastened to an intermediate portion 47 of the link."; line 15, after "pulley" insert -- causes the pulley --; same column 4, lines 22 and 23, after "periphery" insert -- of --; column 7, line 3, for "theother" read -- the other --.

Signed and sealed this 29th day of October 1963.

(SEAL)
Attest:

ERNEST W. SWIDER
Attesting Officer

EDWIN L. REYNOLDS
Acting Commissioner of Patents